(12) United States Patent
Baldemair et al.

(10) Patent No.: US 12,047,923 B2
(45) Date of Patent: Jul. 23, 2024

(54) RESOURCE ALLOCATION SIGNALING FOR SLOT AGGREGATION

(71) Applicant: Telefonaktiebolaget LM Ericsson (publ), Stockholm (SE)

(72) Inventors: Robert Baldemair, Solna (SE); Daniel Chen Larsson, Lund (SE); Fredrik Ovesjö, Älvsjö (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 17/873,541

(22) Filed: Jul. 26, 2022

(65) Prior Publication Data

US 2022/0361169 A1    Nov. 10, 2022

Related U.S. Application Data

(63) Continuation of application No. 17/029,813, filed on Sep. 23, 2020, now Pat. No. 11,412,509, which is a
(Continued)

(51) Int. Cl.
*H04W 72/0446*    (2023.01)
*H04L 5/00*    (2006.01)
(Continued)

(52) U.S. Cl.
CPC ......... *H04W 72/0446* (2013.01); *H04L 5/001* (2013.01); *H04L 5/0037* (2013.01);
(Continued)

(58) Field of Classification Search
None
See application file for complete search history.

(56) References Cited

U.S. PATENT DOCUMENTS

| 10,904,880 B2 * | 1/2021 | Baldemair ........ H04W 72/0453 |
| 11,412,509 B2 * | 8/2022 | Baldemair ............ H04L 5/0037 |

(Continued)

FOREIGN PATENT DOCUMENTS

| CN | 105099634 A | 11/2015 |
| CN | 106385709 A | 2/2017 |

(Continued)

OTHER PUBLICATIONS

International Search Report and Written Opinion dated Dec. 22, 2017 for International Application No. PCT/SE2017/050288 filed on Mar. 24, 2017, consisting of 10 pages.
(Continued)

*Primary Examiner* — Brian S Roberts
(74) *Attorney, Agent, or Firm* — Weisberg I.P. Law. P.A.

(57) ABSTRACT

There is disclosed a method of operating a network node in a Radio Access Network. The method includes transmitting a downlink control information message, the downlink control information message having a slot allocation indication and a symbol allocation indication. The slot allocation indication indicates a slot aggregation having a plurality of slots being allocated for communication to at least one user equipment, wherein each slot com includes prises a plurality of symbols. The symbol allocation indication indicates allocation of symbols to at least one channel according to an allocation pattern for two or more of the plurality of slots. The disclosure also pertains to related methods and devices.

18 Claims, 20 Drawing Sheets

Related U.S. Application Data continuation of application No. 16/333,773, filed as application No. PCT/SE2017/050288 on Mar. 24, 2017, now Pat. No. 10,904,880.

(51) Int. Cl.
  *H04L 27/26* (2006.01)
  *H04W 72/0453* (2023.01)
  *H04W 72/23* (2023.01)

(52) U.S. Cl.
  CPC ........ *H04L 5/0053* (2013.01); *H04L 27/2607* (2013.01); *H04W 72/0453* (2013.01); *H04W 72/23* (2023.01)

(56) References Cited

U.S. PATENT DOCUMENTS

| | | | |
|---|---|---|---|
| 2013/0265944 | A1 | 10/2013 | Frenne et al. |
| 2017/0223725 | A1 | 8/2017 | Xiong et al. |
| 2017/0244535 | A1 | 8/2017 | Islam et al. |
| 2017/0257860 | A1 | 9/2017 | Nam et al. |
| 2017/0290008 | A1 | 10/2017 | Tooher et al. |
| 2018/0146439 | A1 | 5/2018 | Kim et al. |
| 2018/0213554 | A1* | 7/2018 | Zeng ................ H04W 72/1215 |
| 2018/0279297 | A1 | 9/2018 | Nogami et al. |
| 2019/0261337 | A1 | 8/2019 | Park et al. |
| 2020/0015224 | A1* | 1/2020 | Sano ...................... H04B 1/713 |
| 2020/0137747 | A1 | 4/2020 | Xu |

FOREIGN PATENT DOCUMENTS

| | | |
|---|---|---|
| CN | 106489246 A | 3/2017 |
| JP | 2016518091 A1 | 6/2016 |
| WO | 2016018469 A1 | 2/2016 |
| WO | 2016142132 A1 | 9/2016 |
| WO | 2016186042 A1 | 11/2016 |

OTHER PUBLICATIONS

3GPP TSG-RAN5 Meeting #74 R5-170713; Change Request; Title: Annex update to RRM spec for LAA; Source to WG Qualcomm; Source to TSG: R5; Work Item code: LTE_LAA-UEConTest; Location and Date: Feb. 13-17, 2017, consisting of 60-pages.
Final Office Action dated Apr. 20, 2020, issued in U.S. Appl. No. 16/333,773, consisting of 11 pages.
Final Office Action dated Dec. 20, 2019, issued in U.S. Appl. No. 16/293,006, consisting of 18- pages.
Japanese Office Action with English Summary dated Nov. 13, 2020 for Japanese Application No. 2019-552500, consisting of 5-pages.
3GPP TSG RAN WG1 Meeting #88 R1-1702239; Title: On slot aggregation for data transmission; Agenda Item: 8.1.3.3.3; Source: Intel Corporation; Document for: Discussion and Decision; Date and Location: Feb. 13-17, 2017, Athens, Greece, consisting of 6-pages.
3GPP TSG RAN WG1 Meeting #88 R1-1701660; Title: Scheduling scheme for slot aggregation; Agenda Item: 3.1.3.3.3; Source: Huawei, HiSilicon; Document for: Discussion and Decision; Date and Location: Feb. 13-17, 2017, Athens, Greece, consisting of 8-pages.
Chinese Office Action and English summary dated Sep. 1, 2021 for Application No. 201780091109.2, consisting of 13 pages.
Notice of Allowance dated Aug. 27, 2021 for U.S. Appl. No. 16/293,006, filed Mar. 5, 2019, consisting of 12 pages.
3GPP TSG-RAN WG1#NR R1-1701052; Title: On the mini-slot design in NR; Agenda Item: 5.1.4; Source: Nokia, Alcatel-Lucent Shanghai Bell; Document for: Discussion and Decision; Location and Date: Spokane, USA, Jan. 16-20, 2017, consisting of 8 pages.
3GPP TSG RAN1 NR_AH R1-1701343; Title: Summary of off-line discussion Mini-slots; Agenda Item 5.1.4; Source: ZTE, ZTE Microelectronics; Location and Date: Spokane, USA, Jan. 16-20, 2017, consisting of 7 pages.
Korean Notice of Allowance and English Translation dated Nov. 29, 2021 for Application No. 2019-7030249, consisting of 6 pages.
3GPP TSG-RAN WG1 #88 R1-1702638; Title: Slot Aggregation; Agenda Item: 8.1.3.3.3, Source: Qualcomm Incorporated; Document for: Discussion/Decision; Location and Date: Athens, Greece Feb. 13-17, 2017, consisting of 3 pages.
European Communication dated Mar. 16, 2023 for Application No. 177178969 consisting of 5 pages.
3GPP TSG RAN WG1 Meeting #88 R1-1702229; Title: UL control channel design with long duration; Source: Intel Corporation; Agenda Item: 8.1.3.2.2; Document for: Discussion and Decision; Location and Date: Athens, Greece, Feb. 13-17, 2017, consisting of 5 pages.

* cited by examiner

RESOURCE ALLOCATION SIGNALING FOR SLOT AGGREGATION

CROSS-REFERENCE TO RELATED APPLICATIONS

This application is a Continuation of U.S. application Ser. No. 17/029,813, filed Sep. 23, 2020, entitled "RESOURCE ALLOCATION SIGNALING FOR SLOT AGGREGATION", which is a Continuation of U.S. application Ser. No. 16/333,773, filed Mar. 15, 2019 entitled "RESOURCE ALLOCATION SIGNALING FOR SLOT AGGREGATION," which is a Submission Under 35 U.S.C. S 371 for U.S. National Stage Patent Application No. PCT/SE2017/050288, filed Mar. 24, 2017 entitled "RESOURCE ALLOCATION SIGNALING FOR SLOT AGGREGATION," the entireties of which are incorporated herein by reference.

TECHNICAL FIELD

This disclosure pertains to wireless communication technology, in particular in the context of 5G telecommunication, e.g. New Radio (NR) or LTE Evolution.

BACKGROUND

Next to carrier aggregation, in which a plurality of carriers are aggregated or joined together in frequency domain, current development of wireless communication technology also goes into the direction of aggregating transmission timing structures in time domain.

SUMMARY

It is an object of this disclosure to provide approaches allowing efficient signaling in the context of slot aggregation as a form of transmission timing structure aggregation, in particular signaling with limited overhead.

The approaches described herein are particularly useful in the context of NR Radio Access Technology/Networks (NR RAT/RAN). Thus, a network node may in particular a gNB (or eNB in some cases).

Accordingly, there is disclosed a method of operating a network node in a Radio Access Network. The method comprises transmitting a downlink control information message, the downlink control information message comprising a slot allocation indication and a symbol allocation indication. The slot allocation indication indicates a slot aggregation comprising a plurality of slots being allocated for communication to at least one user equipment, wherein each slot comprises a plurality of symbols. The symbol allocation indication indicates allocation of symbols to at least one channel according to an allocation pattern for two or more of the plurality of slots.

Also, there is disclosed a network node for a Radio Access Network. The network node is adapted for transmitting a downlink control information message, the downlink control information message comprising a slot allocation indication and a symbol allocation indication. The slot allocation indication indicates a slot aggregation comprising a plurality of slots being allocated for communication to at least one user equipment, wherein each slot comprises a plurality of symbols. The symbol allocation indication indicates allocation of symbols to at least one channel according to an allocation pattern for two or more of the plurality of slots. The network node may comprise, and/or be adapted for utilising, processing circuitry and/or radio circuitry, in particular a transmitter, for such transmitting. Alternatively, or additionally, the network node may comprise a corresponding transmitting module.

A method of operating a user equipment, UE, in a Radio Access Network may be considered. The method comprises communicating utilising a slot aggregation based on a received downlink control information message, the downlink control information message comprising a slot allocation indication and a symbol allocation indication. The slot allocation indication indicates a slot aggregation comprising a plurality of slots being allocated for communication to the user equipment, wherein each slot comprises a plurality of symbols. The symbol allocation indication indicates allocation of symbols to at least one channel according to an allocation pattern for two or more of the plurality of slots.

In addition, a user equipment for a Radio Access Network is described. The user equipment is adapted for communicating utilising a slot aggregation based on a received downlink control information message, the downlink control information message comprising a slot allocation indication and a symbol allocation indication. The slot allocation indication indicates a slot aggregation comprising a plurality of slots being allocated for communication to the user equipment, wherein each slot comprises a plurality of symbols. The symbol allocation indication indicates allocation of symbols to at least one channel according to an allocation pattern for two or more of the plurality of slots. The UE may comprise, and/or be adapted for utilising, processing circuitry and/or radio circuitry, in particular a transmitter and/or receiver and/or receiver, for such communicating. Alternatively, or additionally, the UE may comprise a corresponding communicating module.

The slot allocation indication may comprise a bit pattern indicating the number of slots being aggregated and/or a slot location indication, the slot location indication indicating the location of a reference slot of the slot aggregation. There may be a unique or 1-1 mapping of slot aggregation length (number of slots in the aggregation) and/or the reference slot location to the bit pattern, e.g. according to a table, which may be predefined or configured.

A slot location may generally pertain to an arrangement in time domain and/or relative to a timing or timing structure. A slot location may indicate where in time a slot is located, e.g. by providing an absolute slot number or a slot number relative to another slot, e.g. a slot in which the downlink control information is received. The reference slot may be a slot of the slot aggregation, based on whose location the location of the slot aggregation may be determined or be fixed. The reference slot may in particular be the first slot of the slot aggregation, or the last slot of the slot aggregation. Based on the reference slot and the number of slots in the slot aggregation the time interval covered by the slot aggregation may be defined or determined.

A bit pattern may generally comprise one or more bits, in particular 2, 3 or 4 bits. It may generally be considered that the symbol allocation indication comprises of 3 bits, which may be mapped to allocation patterns, e.g. represented by starting symbol and/or ending symbol and/or length. The slot allocation indication may comprise of 3 bits, which may be mapped to reference slot locations and/or number of slots in an aggregation.

The symbol allocation indication may comprise a bit pattern, the bit pattern indicating the allocation pattern and/or the channel or channels the symbols are allocated to.

The (allocation) pattern may indicate or represent a starting symbol and/or ending symbol and/or number of symbols allocated to a specific channel.

In some variants, the allocation pattern may indicate or include a guard period between symbols of the allocation pattern allocated to a downlink channel and symbols of the pattern allocated to an uplink channel, and/or vice versa. A guard period may comprise and/or extend over one or more symbol time lengths. A guard period may be associated to no transmission or reception being scheduled.

The downlink control information message may comprise one or more deviation indications, a deviation indication generally indicating a deviation from the pattern for one or more slots. Alternatively, or additionally, the downlink control information message may indicate frequency resource allocation, e.g. subcarrier range, for one or more, in particular for all, slots of the slot aggregation. The frequency resource allocation may be indicated by a frequency allocation indication, and/or may be the same for more than one, in particular for all, slots of the slot aggregate. In the latter case, only one indication may be needed and/or provided. Also alternatively, or additionally, the downlink control information message may comprise a frequency hopping indication, which may indicate a frequency hopping scheme for the allocated channels e.g. between different slots of the slot aggregation, and/or within individual slots.

Alternatively, or additionally, there may be considered that the network node is adapted for, and/or the method of operating the network node comprises, transmitting a second message, e.g. a downlink control information message and/or other configuration message (message comprising configuration data), the second message comprising one or more deviation indications. Communicating utilising the slot aggregation may be based also on the second message. Accordingly, greater flexibility for deviations from the pattern may be provided, while limiting the overhead of the downlink control information message. The second message, and/or the downlink control message, may be valid for the duration of the slot aggregation (dynamic), or valid for a plurality of such durations (semi-static), e.g. provided in RRC signaling.

Allocating a slot aggregation for communication may pertain to allocating resources associated to the slots of the aggregation for communication. The resources may be time-frequency resources associated to, and/or arranged or located within, the time interval defined by the slot aggregations, respectively associated to the symbol time intervals of the symbols of the slot aggregation, which comprise the symbols of the slots of the aggregation. Allocating may generally comprise indicating, e.g. to a user equipment, which symbols and/or resources to use for which king of communication, e.g. transmitting or receiving, and/or on which channel.

An allocation pattern may generally indicate at least one channel that is allocated to one or more symbols (or vice versa, as the allocation may represent a unique or 1-1 mapping). However, in some cases, there may be allocated more than one channel to a symbol, e.g. a control and a data channel. In this case, the channels may be multiplexed, in particular in frequency. Such channels may represent the same direction of communication, e.g. transmitting or receiving. The allocation pattern may indicate the frequency resource/s allocated to the channel/s, or such may be implicitly indicated, e.g. according to a configuration or predefinition or rule. An allocation pattern may allocate symbols for two or more slots such that the pattern of symbols repeats for each slot. For example, the same channel/s may be allocated to symbols (respectively the associated resources) with the same number inside each slot. It may be assumed that the symbols in a slot may be numbered by successive integers, e.g. from 0 to 6 or 0 to 13, or 1 to 7 or 1 to 14, depending on the total number of symbols in a slot. The numbering may be analogous between slots with the same number of symbols. Successively numbered symbols may be neighboring to each other in time domain, with a common time border.

The downlink control information message may allocate and/or schedule the slot aggregation, such that resources of the slot aggregation are allocated for communication.

A slot may comprise a plurality of symbols, in particular 7 or 14 symbols. However, a slot may be implemented as a mini-slot with fewer symbols than a full slot in some variants. It may be considered that the slots of the slot aggregation have the same number of symbols, and/or that the slots of the slot aggregation have the same durations (extension in time domain). However, there may be considered variants in which different slot durations, or slots with different number of symbols, are aggregated into a slot aggregation. In this context it may be considered that an allocation pattern only pertains to slots having the same duration or the same number of symbols, to limited signaling overhead. A slot aggregation may comprise two or more slots, in particular 2, 3 or 4, or an even number of slots.

Allocating symbols to at least one channel may comprise indicating one or more channels on which to communicate. A channel may be an uplink or downlink or sidelink channel. In particular, a channel may be a physical channel. Examples of channels that may be allocated comprise PUCCH, PUSCH, PDSCH, PDCCH. A channel may be a control channel, e.g. PUCCH or PDCCH, or a data channel, e.g. PUSCH or PDSCH. A control channel, in particular a downlink control channel, may be arranged or allocated in a control region, which may cover one or more symbols of a slot of the slot aggregation, e.g. at the beginning of the slot. It may be considered that an uplink control region is allocated an uplink control channel. An allocation pattern may for example be continuous in time domain and/or frequency domain for a time interval covering one or more symbols and/or a frequency interval covering one or more subcarriers. Such a pattern may appear rectangular in a time/frequency diagram representation. The symbol allocation indication may indicate the location and/or extension of such a pattern in time domain, e.g. by indicating a starting and ending symbol, and/or a starting or ending (also referred to as stop) symbol and a duration (e.g., in number of symbols) or length. A symbol may in particular be an OFDM (Orthogonal Frequency Division Multiplexing) symbol, e.g. in NR downlink, or a OFDMA (Orthogonal Frequency Division Multiple Access) or SC-FDMA (Single Carrier Frequency Division Multiple Access) symbol in uplink or sidelink.

Communicating utilising a slot aggregation may comprise transmitting and/or receiving on the channels allocated according to the allocation pattern.

The slots of a slot aggregation may be arranged in time such they form a continuous time interval covered by the symbols time intervals of the symbols of the slots.

Generally, to a symbol there may be associated a symbol time interval, and a frequency range, e.g. a number of subcarrier. For ease of reference, it may be referred to a symbol even if only the time domain extension (symbol time interval) is referred to. In the context of resources or allocation, an extension of a symbol into the frequency domain may be assumed. The symbols or slots of a slot aggregation may comprise the same extension in frequency domain, e.g. pertain to the same subcarriers or carriers. The extension in frequency domain may be continuous.

An allocation pattern pertaining to a plurality of slots may be considered to comprise an allocation (sub-)pattern valid for one slot, which is repeated in the other slots of the plurality of slots.

It should be noted that in some variants, the slot allocation indication and the symbol allocation indication pertain to allocation in time domain, pertaining to symbols or slots, respectively their associated time intervals. Frequency allocation may be implicitly indicated, or explicitly with a corresponding frequency allocation indication in the downlink control information message.

A downlink control information message may comprise downlink control information, in particular pertaining to scheduling and/or allocation, for uplink and/or downlink and/or sidelink communication.

A program product comprising instructions causing processing circuitry to control and/or perform any one of the methods described herein is also disclosed.

Moreover, there is disclosed a carrier medium arrangement carrying and/or storing a program product as disclosed herein.

A transmission timing structure may generally comprise a (e.g., pre-defined and/or configured) number of symbols or symbol time intervals. A slot may be considered a representation or implementation of a transmission timing structure, and the terms may be interchanged in the context of this disclosure. A transmission timing structure may define a time interval. To a transmission timing structure and/or slot there may associated frequency resources, such that a slot may represent time/frequency resources, based on a time interval of the slot. A slot aggregation may comprise a plurality of slots scheduled with a single downlink control information message.

BRIEF DESCRIPTION OF THE DRAWINGS

The drawings are provided to illustrate concepts and approaches described herein, and are not intended to limit their scope. The drawings comprise:

FIG. 17, showing an exemplary diagram of a method of operating a user equipment;

FIG. 19, showing an exemplary diagram of a method of operating a network node; and FIG. 20, showing an exemplary network node.

DETAILED DESCRIPTION

Figure 1:
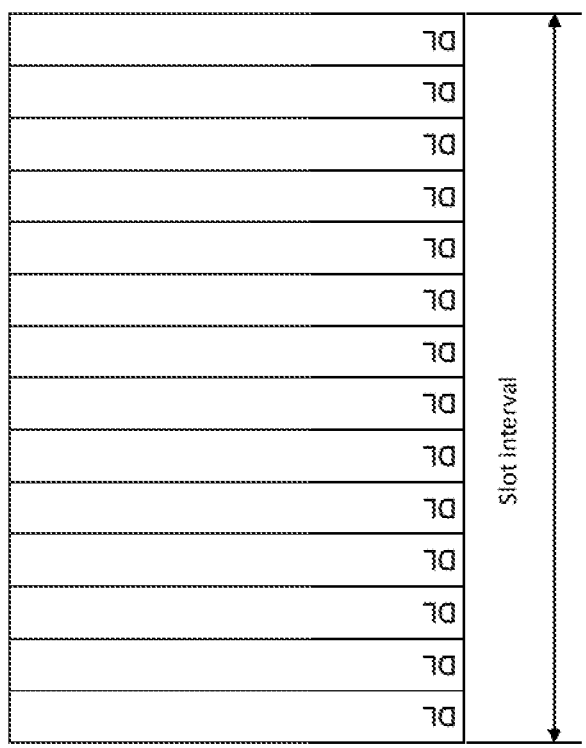
FIGS. 1 to 4, showing exemplary variants of slots for TDD.
Figure 2:
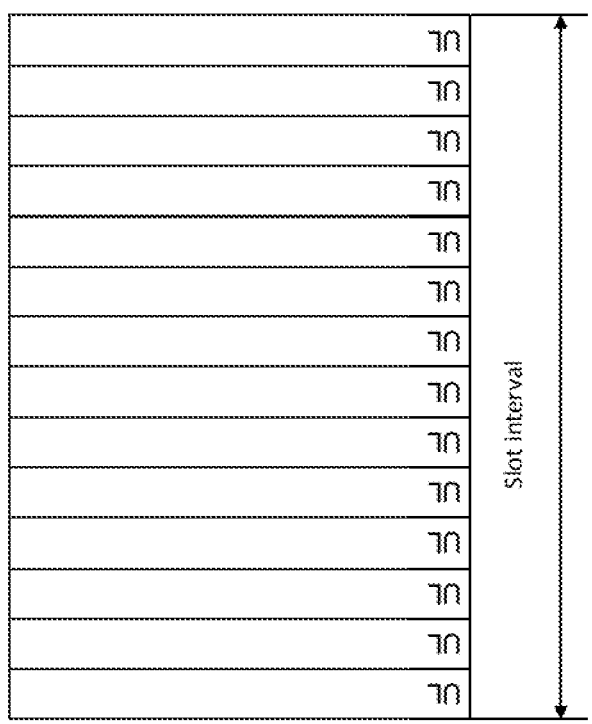
Figure 3:
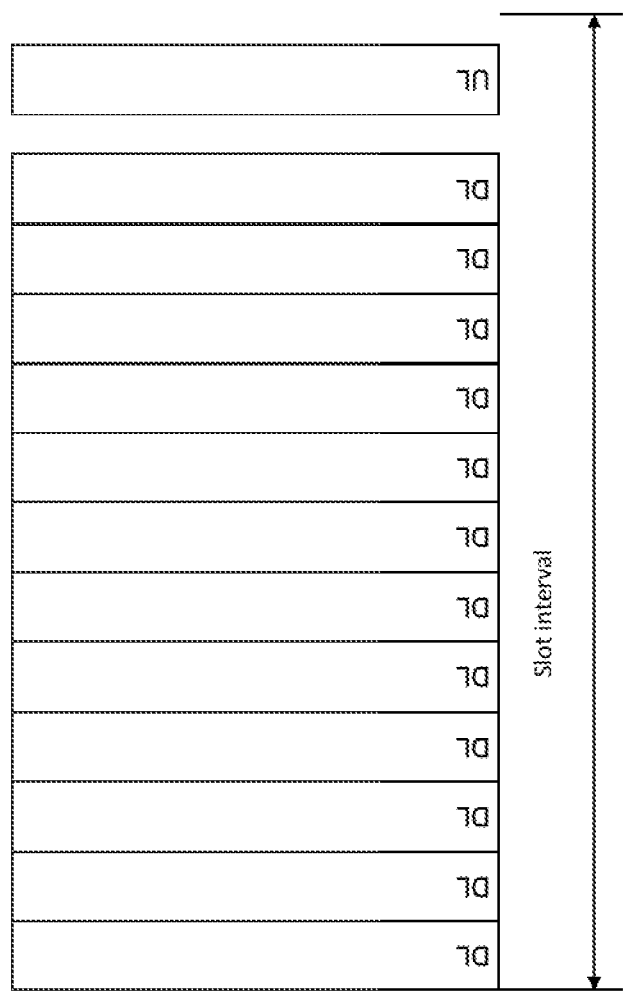
Figure 4:
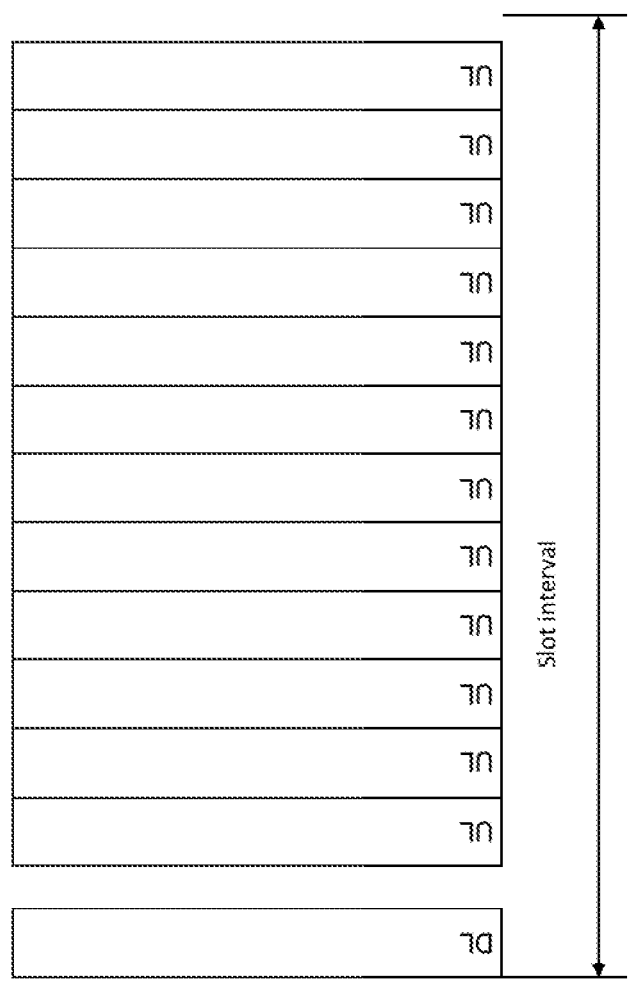

NR supports a very flexible frame structure. A slot can be of length 7 or 14 OFDM symbols. In TDD, one slot interval can either contain DL (Downlink) only, UL (Uplink) only, or both UL and DL transmissions. FIG. 1 graphically shows a DL-only slot, FIG. 2 an UL-only slot, FIG. 3 a DL-heavy slot with UL in the end, and FIG. 4 an UL-heavy slot with DL in the beginning. FIGS. 1 to 4 show four types of slot for TDD. In these examples, the slot length is N_slot=14. It should be noted that the concepts and approaches described herein are only illustrated in the context of TDD, but are equally applicable to Frequency Division Duplex (FDD). Moreover, the slot duration may vary depending on frequency or numerology used, as the subcarrier spacing may depend on either, such that the symbol time interval associated to a symbol may be different for different carrier frequencies and/or numerologies. Accordingly, for equal number of symbols in a slot, slot duration may vary. It may be considered that the slots described herein pertain to the same numerology and/or subcarrier spacing and/or carrier, such that the symbols may have the same symbol time interval (symbol duration).

DL portions of a slot often start with a DL control region. The presence of a DL control region and the length of the DL control region may be dynamically indicated (e.g. via DCI on PDCCH), semi-statically configured (e.g. via RRC signaling) or blindly detected by the UE.

The DL data region (PDSCH) in a slot can extend from the beginning of the slot until the end of the slot (DL-only slots) or stops earlier to accommodate an UL opportunity in the end. The start of PDSCH can either be the beginning of the slot or it can start within or after the control region. In case PDSCH starts within the control region, special care is needed how to multiplex data and control channels (PDCCH) in the control channel region. If an UL opportunity exists at the end of the slot interval, PDSCH must stop earlier to accommodate the UL transmission together with DL->UL and possibly UL->DL guard times or periods, e.g. when switching back to DL in the next slot.

Similar to DL-heavy slots are UL-heavy slots, but for such, the DL region (also referred to as DL for conciseness) is very short (e.g. 1 or 2 symbols), followed by a guard time and an UL region (also referred to as UL). A DL region may comprise one or more symbols in which downlink transmission (or reception thereof from the UE's point of view) is scheduled, an UL region may comprise one or more symbols in which uplink transmission is scheduled. Analogously, there may be considered sidelink regions, e.g. sidelink transmission regions and/or sidelink reception regions.

The UL contains in the beginning the UL data region (PUSCH) and optionally an UL control region in the end (PUCCH). PUSCH may stop before the UL control region or it may continue until the end of the slot interval. In case PUSCH continues until the end of the slot and overlaps a symbol containing PUCCH, special care is needed how to multiplex data and control channels (PUCCH) in the control channel region.

Slot aggregation is discussed in the following.

To enable longer transmissions (to improve coverage), or to use fewer PDCCH transmissions (to reduce control channel overhead), it is possible to schedule transmission units consisting of several slots. Such a unit is referred to as slot aggregation. One possibility would be to schedule PDSCH/PUSCH of each slot with its own PDCCH, however, in this case the distinction to individually scheduling multiple slots becomes unclear. It is therefore assumed that a slot aggregate is scheduled with a single DCI (a single message). DCI, Downlink Control Information, may be considered to represent more generalized downlink control information in the context of NR.

Figure 5:
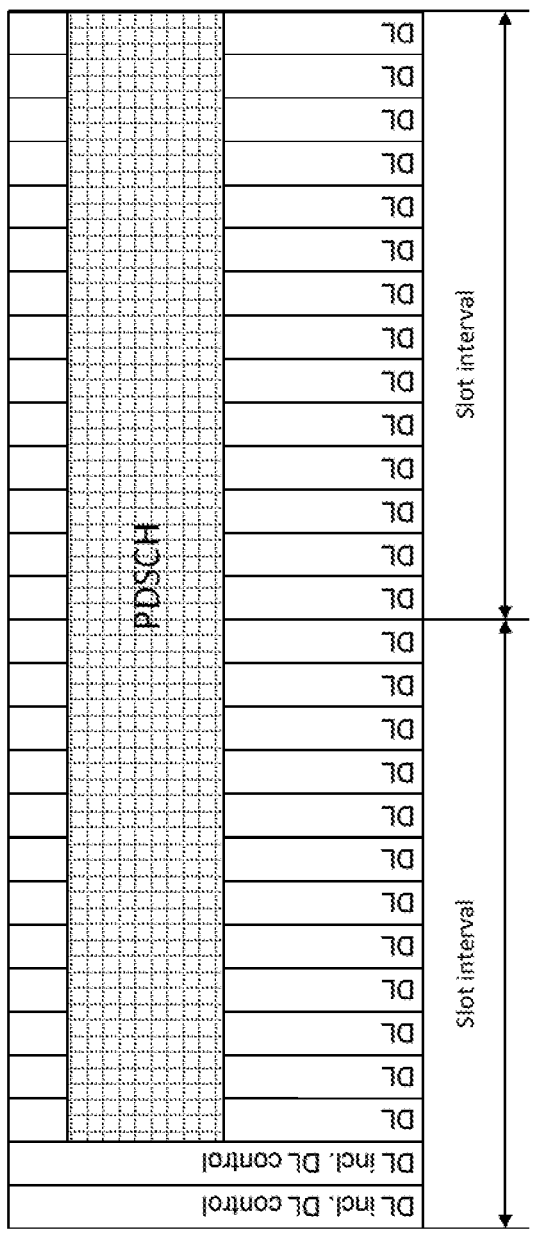
FIGS. 5 to 10, showing examples of slot aggregations.
Figure 6:
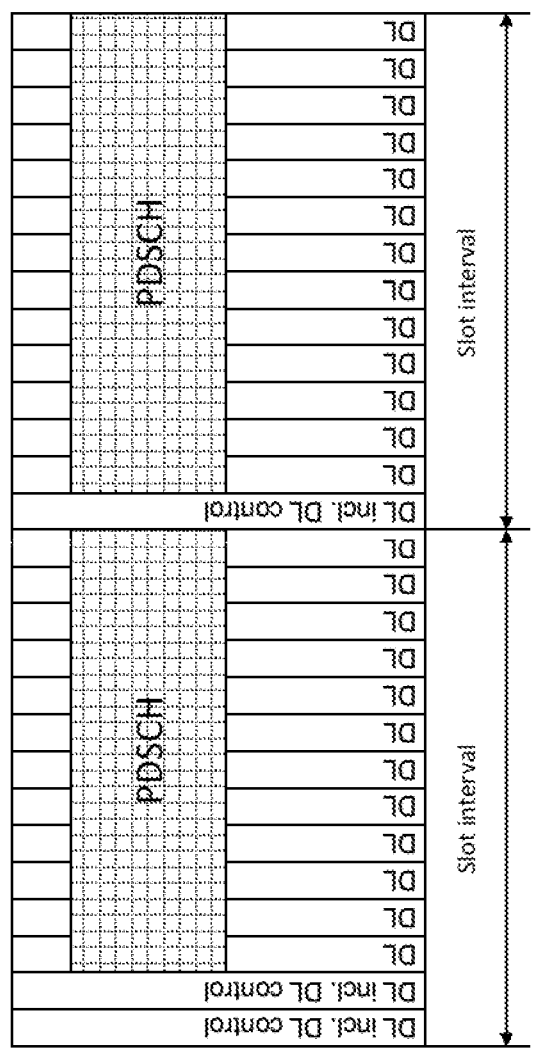
Figure 7:
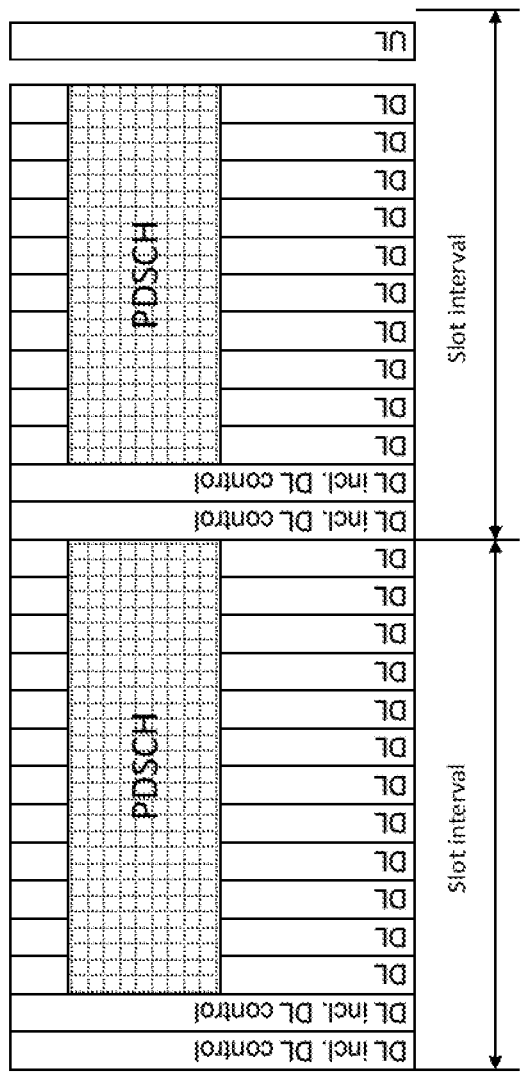

FIGS. 5 to 7 show examples of different DL slot aggregates. As it can be seen, the symbols available for PDSCH as well as the symbol pattern depend very much on the slot aggregation format. These examples show that PDSCH does not overlap the DL control region, however, it is also possible that PDSCH overlaps (partly or fully in time) with the DL control region. Specifically, FIGS. 5 to 7 show examples of slot aggregation. In these examples, the slot length is N_slot=14. In FIG. 5, a DL slot is followed by a DL slot without DL control region. In FIG. 6, both aggregated slots have a DL control region. In FIG. 7, a DL slot with control region is followed by a mixed slot with both DL control region and UL opportunity.

Figure 8:
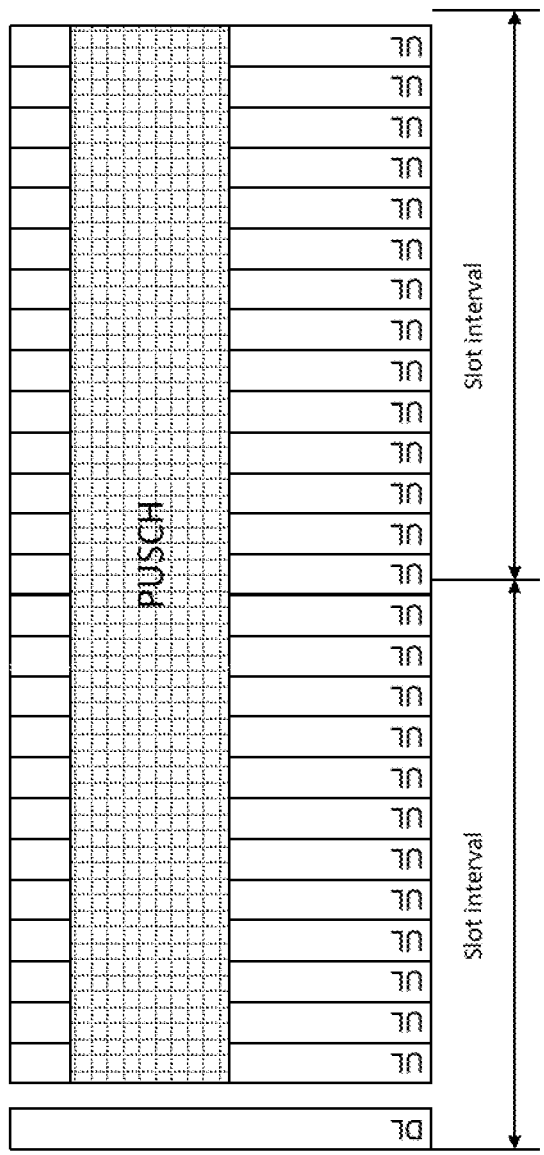
Figure 9:
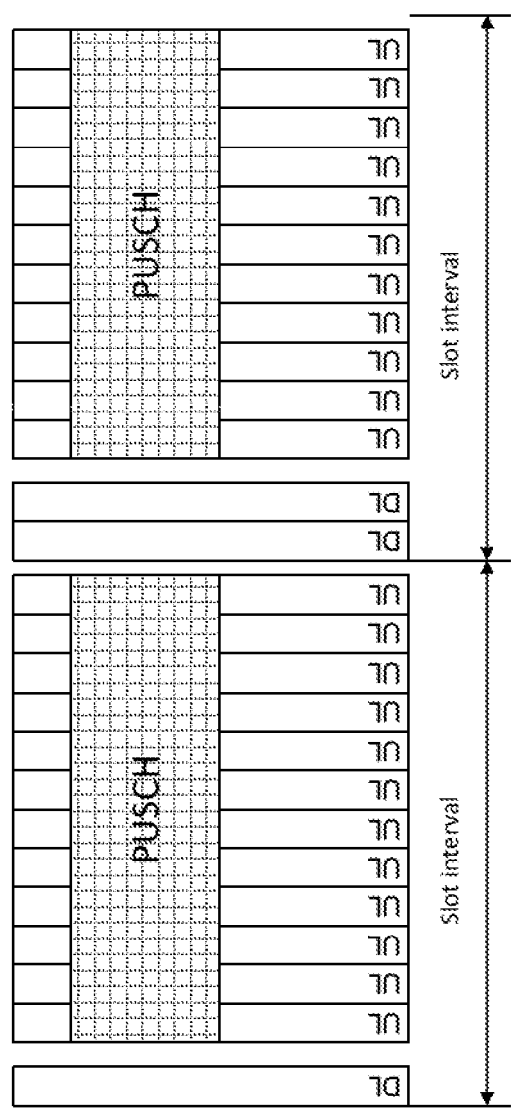
Figure 10:
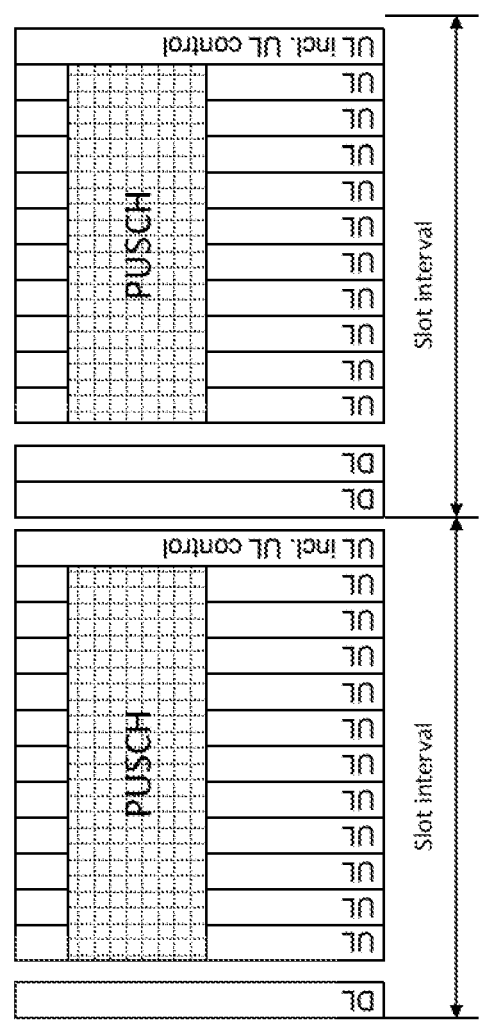

In FIGS. 8 to 10, examples for UL slot aggregation are shown. As it can be seen, the symbols available for PUSCH as well as the symbol pattern depend very much on the slot aggregation format. FIGS. 8 to 10 in particular show examples of UL slot aggregation. In these examples, the slot length is N_slot=14. In FIG. 8, an UL-heavy slot is followed by an UL-only slot. In FIG. 9, both slots are UL-heavy. In FIG. 10, both slots are UL-heavy and have an UL control region in the end.

As can be seen from FIGS. 5 to 7 and FIGS. 8 to 10, a wide variety of slot aggregation formats may be considered. The available symbols for PDSCH/PUSCH depend very much on the slot aggregation format. Since a slot aggregate is signaled with a single DCI message, the resource allocation in particular in time domain, pertaining to allocation of symbols to channels, for the complete slot aggregate is contained in a single DCI message. Given the large numbers of possibilities (of which FIGS. 5 to 10 show just a few examples), the signaling for the time-domain resource allocation for PDSCH/PUSCH may become very complex and require a large signaling overhead.

There are discussed approaches to reduce overhead for the signaling of time-domain resource allocation in slot aggregation. It is proposed that the signaling allows in-detail definition of time-domain allocation of PDSCH/PUSCH in a single slot based on a symbol allocation indication (in the following called symbol allocation). At least one of flexible start position, length, and flexible stop position may be provided. For slot aggregation, the symbol allocation is applied to multiple slots. In addition, also the number of scheduled slots may be signaled, utilising a slot allocation indication (in the following called slot allocation).

The required signaling of slot aggregation is just slightly larger than for a single slot (the scheduled numbers of slots needs to be provided), which however will only require very few bits.

An optional extension of the approaches allows adjustments (deviations) to the repeated resource allocation, e.g. each (or at least some) scheduled slot could have an additional single bit or very few additional bits assigned to signal some adjustment, e.g., in form of a deviation indication.

The proposed solution reduces signaling overhead for time-domain resource allocation in slot aggregation. This reduces DCI size, which reduces control channel load, often a bottleneck in wireless systems. With a reduced control channel overhead it is more often possible to schedule terminals avoiding the situation that data resources are available, but cannot be scheduled because of lacking control resources. Further, reduced DCI size also results in better control signaling coverage and/or improved control signaling detection rate.

The time-domain resource allocation field of a DCI message for slot aggregation may comprise two parts (e.g., two fields or a joint field from which both information can be derived, and/or a two bit patterns, or one bit pattern joined from two bit patterns to a larger bit pattern), the two parts representing a symbol allocation indication and a slot allocation indication. The number of scheduled slots (in the following called slot allocation) may be indicated, and details of the time-domain resource allocation of PDSCH/PUSCH within one slot (in the following called symbol allocation) may be indicated, which represent an allocation pattern. The symbol allocation specified in 2) is applied to all or at least multiple scheduled slots of the slot aggregation.

Figure 11:
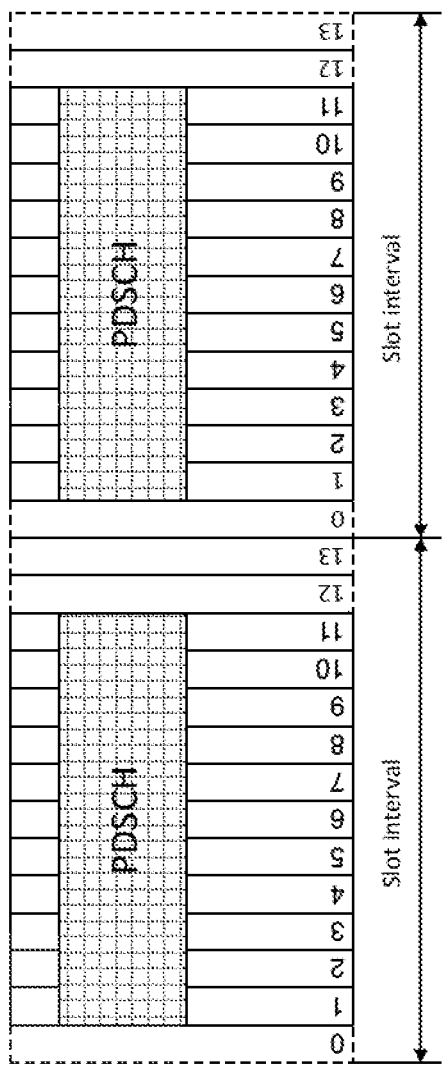
FIG. 11, showing an example of DL slot aggregation with an allocation pattern.

FIG. 11 shows an example for DL slot aggregation. The time-domain resource allocation field specifies that 2 slots are aggregated, and that the PDSCH starts in symbol 1 and ends in symbol 11. The same pattern of PDSCH start and stop symbols is applied to both slots. Using the exemplary Table 1 and Table 2 to indicate slot allocation and symbol allocation, the example in FIG. 11 would use the entries 001 or 101 for slot allocation (Table 1, to indicate 2 aggregated slots, 001 or 101 for different first slot values) and 011 for symbol allocation (Table 2, N_slot=14 assumed). As can be seen, FIG. 11 shows DL slot aggregation with 2 slots. Each slot uses the same time-domain resource allocation. In this example, the slot length is N_slot=14.

Figure 12:
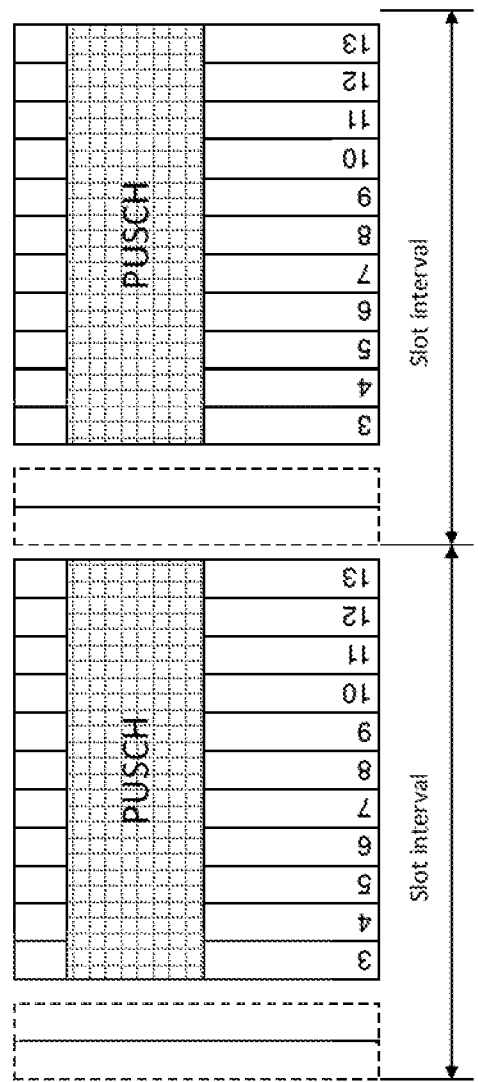
FIG. 12, showing an example of UL slot aggregation with an allocation pattern.

UL slot aggregation is shown in FIG. 12, in which also two slots are aggregated. The symbol allocation specifies that symbols 3 to 13 are used in each slot for PUSCH.

Using the exemplary Table 1 and Table 3 to indicate slot allocation and symbol allocation, the example in FIG. 12 would use the entries 001 or 101 for slot allocation (Table 1, to indicate 2 aggregated slots, 001 or 101 for different first slot values) and 101 (Table 3, N_slot=14 assumed) for symbol allocation. For the UL slot aggregation with 2 slots in FIG. 12, each slot uses the same time-domain resource allocation (allocation pattern). In this example the slot length is N_slot=14.

Slot allocation is discussed in more detail in the following.

The field indicating how many slots are scheduled may also indicate which slots, at least in combination with some other information, e.g. a semi-statically configured slot offset. For DL, it will be often that PDSCH starts in the same slot as the DCI message is received, in this case a simple slot length indicator would be sufficient. In UL, however, only fast terminals will be able to receive an UL grant (PDCCH) in a DCI message in slot n, and to transmit PUSCH in slot n. Most terminals will only support transmission in slot n+1. One possibility would be to semi-statically configure an offset value k, indicating a reference slot location, so that PUSCH always starts in slot n+k given that DCI has been received in slot n. Table 1 shows a table where the slot allocation contains 3 bits. The first bit indicates that the assignment starts in slot n+n_(OS,1) or n+n_(OS,2), with n_(OS,1) and n_(OS,2) semi-statically configured offset values, which could e.g. be 0 and 1 (typical values for DL), or 1 and 2 (typical values for UL). n is the slot the DCI has been received in. Thus, the location of the first slot (starting slot) as reference slot is indicated. The remaining two bits indicate the number of aggregated slots, in this example they indicate 1 to 4 aggregated slots, but in a more general case these four values could be different, e.g. semi-statically configured.

TABLE 1

The exemplary slot allocation consists of 3 bit.
The first bit indicates the first slot and the remaining
two bits the number of aggregated slots.

| Bit pattern | First slot | Number of aggregated slot/s |
| --- | --- | --- |
| 000 | n + n_(OS, 1) | 1 |
| 001 | n + n_(OS, 1) | 2 |

TABLE 1-continued

The exemplary slot allocation consists of 3 bit.
The first bit indicates the first slot and the remaining
two bits the number of aggregated slots.

| Bit pattern | First slot | Number of aggregated slot/s |
|---|---|---|
| 010 | n + n_(OS, 1) | 3 |
| 011 | n + n_(OS, 1) | 4 |
| 100 | n + n_(OS, 2) | 1 |
| 101 | n + n_(OS, 2) | 2 |
| 110 | n + n_(OS, 2) | 3 |
| 111 | n + n_(OS, 2) | 4 |

If a fixed (semi-statically configured) start position of the data channel (PDSCH and PUSCH) is too restrictive, a start/stop allocation similar to LTE resource allocation format 2 can be considered for the slot allocation. If non-contiguous slot aggregation is supported, a bitmap is needed with a bit position for each slot that can be scheduled, e.g. [b0 b1 b2 b3] could refer to slots n+k+bi with n being the slot the DCI has been received in, and k being a fixed or semi-statically configured offset number.

Symbol allocation is discussed in more detail below.

Table 2 shows an example how DL symbols are allocated to PDSCH. Depending on presence and form of a control channel region, a PDSCH start position of 0 and 1 can imply that PDSCH shares an OFDM symbol with PDCCH (assuming a control channel region ranging from 0 to 2 OFDM symbols). PDSCH can extend either until the end of the slot (no UL opportunity at the end of the slot interval), or until symbols N_slot-4 or N_slot-3. For the last two cases, an UL opportunity of 2 and 1 symbols together with a guard time of 1 symbol has been considered. N_slot is the slot length and could e.g. be 7 or 14 symbols. To keep the number of bits to 3, the combination of start position 0 and end position N_slot-4 has been omitted. In Table 2 start and stop position are provided, start (or stop) and length indication would be an alternative signaling.

TABLE 2

Symbol allocation for PDSCH

| Bit pattern | PDSCH start symbol | PDSCH stop symbol |
|---|---|---|
| 000 | 0 | N_slot-3 |
| 001 | 0 | N_slot-1 |
| 010 | 1 | N_slot-4 |
| 011 | 1 | N_slot-3 |
| 100 | 1 | N_slot-1 |
| 101 | 2 | N_slot-4 |
| 110 | 2 | N_slot-3 |
| 111 | 2 | N_slot-1 |

Table 3 shows a similar table for PUSCH symbol allocation. PUSCH can either start in symbol 1 (no DL and DL control region in this slot, i.e. PUSCH is scheduled from a previous slot, but 1 empty symbol in the beginning is needed for switching time and timing advance), or in symbol 2, 3, and 4. The latter three cases assume a DL control region of 1 or 2 symbols together with a guard time of 1 or 2 symbols. A longer guard period could for example be provided if DCI indicates PUSCH in the same slot, and that the UE needs more processing time, while a guard period of 1 symbol would be sufficient if PUSCH is sent in next slot or subframe. If PUSCH is transmitted in the next slot or subframe the guard would only need to cover UE switching time and timing advance. PUSCH can either extend until the end of the slot or stop earlier (in this example 1 symbol earlier to make space for a short PUCCH in the end, could also be 2 symbols or maybe even 1 or 2 symbols at the expense of an additional signaling bit). It would also be possible to combine the slot allocation (Section 5.1.1) and the symbol allocation, since e.g. the combination of PUSCH starting in a future slot together with PUSCH starting at symbol 4 is maybe not needed (PUSCH start symbol 4 would give a UE extra time to decode DCI if DCI is sent in same slot). In Table 3 start and stop position are provided, start (or stop) and length indication would be an alternative signaling.

TABLE 3

Symbol allocation for PUSCH

| Bit pattern | PUSCH start symbol | PUSCH stop symbol |
|---|---|---|
| 000 | 1 | N_slot-2 |
| 001 | 1 | N_slot-1 |
| 010 | 2 | N_slot-2 |
| 011 | 2 | N_slot-1 |
| 100 | 3 | N_slot-2 |
| 101 | 3 | N_slot-1 |
| 110 | 4 | N_slot-2 |
| 111 | 4 | N_slot-1 |

Applying the same symbol allocation to all slots is maybe too restrictive. For example, a DL slot aggregate PDSCH that is scheduled in slot n and starts in slot n at symbol 1 would have a hole at the beginning of all subsequent slots. To increase flexibility, small signaling fields for some/all slots to indicate adjustments by representing deviation indications may be provided in the downlink control information message. However, the adjustment signaling (deviation indication/s) may be positions limited to limit signaling overhead.

Figure 13:
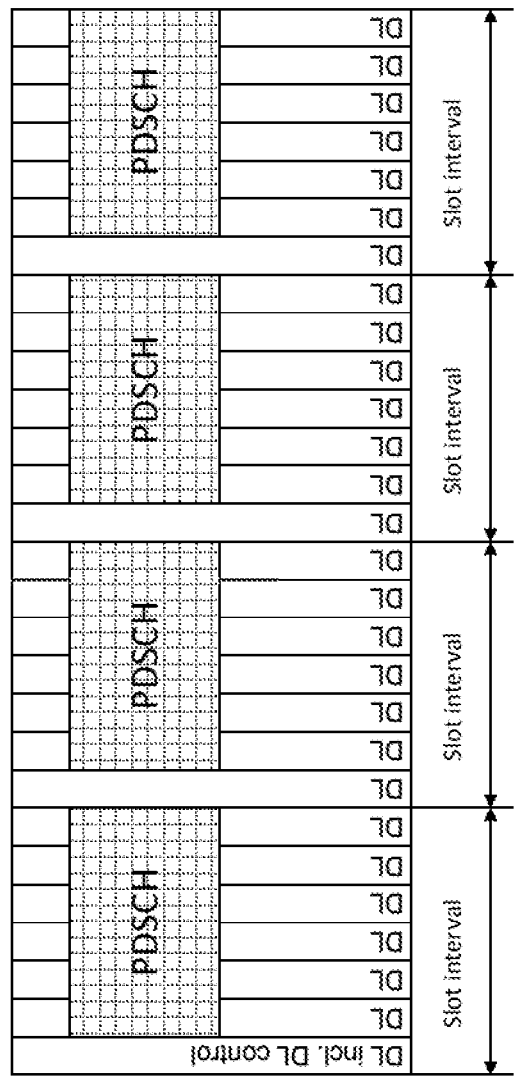
FIG. 13, showing an example of slot aggregation with holes.
Figure 14:
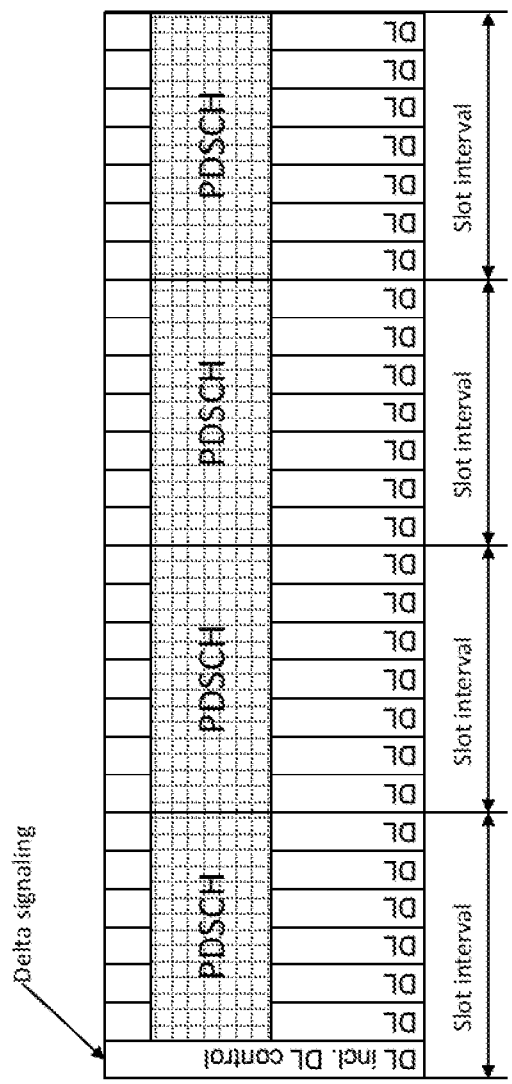
FIG. 14, showing an example of slot aggregation with deviation indication.

FIGS. 13 and 14 show examples in which 4 slots are scheduled in an aggregate. In FIG. 13 without allowed adjustments, PDSCH would be mapped to symbols 1 to N_slot-1 in each slot, i.e. there is a hole in PDSCH in each slot. Allowing an adjustment for the first slot, one could signal for all slots PDSCH symbol allocation 0 to N_slot-1 (entry 001 in Table 2) but then signal an exception/adjustment for the first slot (PDSCH in first slot starts at symbol 1), as shown in FIG. 14. In this example N_slot=7 is assumed.

It should be noted that the exceptions/adjustments mentioned may be considered deviations from the allocation pattern for specific slots.

In particular, in FIG. 13, all slots use symbol allocation 1 to 6 (100 in Table 2) for PDSCH and holes in PDSCH mapping occur. In FIG. 14, utilising corresponding deviation indication, all slots use symbol allocation 0 to 6 (001 in Table 2) for PDSCH and holes in PDSCH mapping can be avoided. Adjustment signaling (deviation indication) is used for the first slot.

Instead of explicit signaling of the adjustment for the first slot, an implicit rule can be applied instead. An example rule would be that the start/stop symbol allocation is valid in all slots of the slot aggregate except the first slot, where the PDCCH symbol(s) that contained the DCI shall be excluded from the start/stop allocation. Alternatively, if PDSCH start position/PDCCH stop position/control region stop position is indicated on the group common PDCCH this information can be used to adjust PDSCH start position in one or multiple slots of the slot aggregate (if PDCCH or control region stop position is signaled it is assumed PDSCH starts after PDCCH or control region).

A similar technique can be used to signal a PDSCH that stops early in the last slot to provide an UL opportunity. In this case, the common symbol allocation would signal that PDSCH extends until the last symbol in each slot and adjustment signaling for the last slot would indicate that PDSCH stops e.g. in symbol N_slot-2. Alternatively, if DL stop position/UL start position is indicated on the group common PDCCH this information can be used to adjust PDSCH stop position in one or multiple slots of the slot aggregate.

Adjustment signaling can also be used for PUSCH. For example, a PUSCH slot aggregate which scheduling DCI is at the beginning of the first slot cannot start at symbol 0 in the first slot. Copying the same symbol allocation would again result in holes in PUSCH mapping. Again, the common symbol allocation could signal PUSCH is mapped to symbols 0 to N_slot-1 in all slots and adjustment signaling is used to modify the time-domain resource allocation for the first slot.

Another possibility is to repeat the symbol allocation just for a subset of the allocated slots. Symbol allocation for other slots needs then to be provided by other means.

For even more flexibility, the symbol allocation can be provided for each of the allocated slots in the same DCI. This results in larger signaling overhead, but since other parts of the DCI, such as the frequency-domain resource allocation are not provided for each of the slots in the slot aggregate, the signaling is smaller than providing separate DCI in each slot. Accordingly, the allocation pattern may specifically cover more than one slot with different or the same subpatterns.

In the DCI message, it could further be assumed that in one example, the same frequency allocation is used in all the allocated slots. This as it would then be possible to have a one frequency allocation bit field in the DCI message for all aggregated slots. To introduce some frequency diversity, it could be possible to add on top a frequency hopping scheme that is applicable per slot (potentially even intra-slot). Frequency-domain resources could be provided separately for each slot (or sub-group of slots within slot aggregate) or a rule can be used to derive frequency-domain resources for at least one additional slot given frequency-domain resources for at least one slot. The It may generally be considered to provide a downlink control information message specifying the time-domain resource allocation for slot aggregation such based on an allocation pattern for a single slot, which is applied to other, in particular all, scheduled slots of the slot aggregate. This reduces overhead required for signaling the time-domain resource allocation in slot aggregation.

Figure 15:
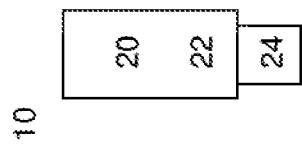
FIG. 15, showing an exemplary user equipment.

FIG. 15 schematically shows a terminal or wireless device 10, which may be implemented as a UE (User Equipment). Terminal 10 comprises processing circuitry (which may also be referred to as control circuitry) 20, which may comprise a controller connected to a memory. Any module of the terminal, e.g. a communicating module, or transmitting module or receiving module, may be implemented in and/or executable by, the processing circuitry 20, in particular as module in the controller. Terminal 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the terminal 10 is connected or connectable to the radio circuitry 22 to collect or send and/or amplify signals. Radio circuitry 22 and the processing circuitry 20 controlling it are configured for cellular communication with a network, e.g. a RAN as described herein. Terminal 10 may generally be adapted to carry out any of the methods of operating a terminal or UE disclosed herein; in particular, it may comprise corresponding circuitry, e.g. processing circuitry, and/or modules.

Figure 16:
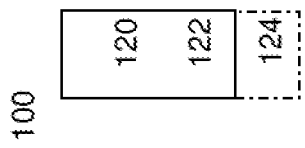
FIG. 16, showing an exemplary network node.

FIG. 16 schematically show a network node 100, which in particular may be an eNB, or gNB or similar for NR. Network node 100 comprises processing circuitry (which may also be referred to as control circuitry) 120, which may comprise a controller connected to a memory. Any module, e.g. transmitting module and/or receiving module and/or configuring module of the network node 100 may be implemented in and/or executable by the processing circuitry 120. The processing circuitry 120 is connected to control radio circuitry 122 of the radio node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. The network node 100 may be adapted to carry out any of the methods for operating a network node disclosed herein; in particular, it may comprise corresponding circuitry, e.g. processing circuitry, and/or modules. The antenna 124 circuitry may be connected to and/or comprise an antenna array. The network node 100, respectively its circuitry, may be adapted to transmit configuration data and/or to configure a terminal as described herein.

FIG. 17 shows a diagram for an exemplary method of operating a user equipment, which may be any of the user equipments described herein. The method comprises an action TS10 of communicating as disclosed herein.

Figure 18:
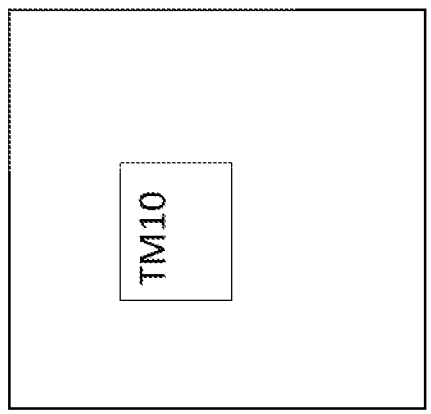
FIG. 18, showing an exemplary user equipment.

FIG. 18 shows a schematic of an exemplary user equipment. The user equipment may comprise a communicating module TM10 for performing action TS10.

FIG. 19 shows a diagram for an exemplary method of operating a network node, which may be any of the network nodes described herein, in particular a gNB or eNB. The method comprises an action NS10 of transmitting a downlink control information message as disclosed herein.

Figure 20:
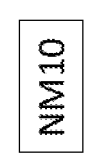

FIG. 20 shows a schematic of an exemplary network node. The network node may comprise a transmitting module NM10 for performing action NS10.

An uplink control channel is described in the following. NR will support different formats of the Physical Uplink Control Channel (PUCCH). PUCCH carries Uplink Control Information (UCI) comprising acknowledgement signaling like HARQ feedback (ACK/NACK), and/or Channel Quality Information (CQI), and/or Scheduling Request (SR).

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. Acknowledgement signaling may comprise one or more bits (e.g., for ACK/NACK) for an acknowledgement signaling process, and/or comprise additional information, e.g. indicating that a data element was not received and/or scheduled.

Signaling may generally comprise one or more symbols and/or signals and/or messages. A signal may comprise one or more bits. An indication may represent signaling, and/or be implemented as a signal, or as a plurality of signals. One or more signals may be included in and/or represented by a message. Signaling, in particular acknowledgement signaling, may comprise a plurality of signals and/or messages, which may be transmitted on different carriers and/or be associated to different acknowledgement signaling processes, e.g. representing and/or pertaining to one or more such processes. An indication, may comprise signaling and/or a plurality of signals and/or messages, which may be transmitted on different carriers and/or be associated to different acknowledgement signaling processes, e.g. representing and/or pertaining to one or more such processes. A message may represent a block of data jointly encoded and/or modulated, and/or information (e.g., one or more indications) transmitted together. A message may be addressed to a specific receiver, e.g. a user equipment. It may be considered that a message has a format, which may be defined according to a standard, in particular according to a 3GPP standard like NR.

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent and end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM). Radio circuitry may comprise one or more transmitters and/or receivers and/or transceivers (a transceiver may operate or be operable as transmitter and receiver), and/or may comprise one or more amplifiers and/or oscillators and/or filters, and/or may comprise, and/or be connected or connectable to antenna circuitry and/or one or more antennas.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries.

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary.

Transmitting in downlink may pertain to transmission from the network or network node to the terminal. Transmitting in uplink may pertain to transmission from the terminal to the network or network node.

Signaling may generally comprise one or more signals and/or one or more symbols. Reference signaling may comprise one or more reference signals or symbols.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE.

A resource generally may represent a time-frequency resource, on which signaling according to a specific format may be transmitted and/or be intended for transmission, and/or a code resource and/or a power resource. The format may comprise one or more substructures, which may be considered to represent a corresponding sub-resource (as they would be transmitted in a part of the resource).

Control information or a control information message or corresponding signaling may be transmitted on a control channel, e.g. a physical control channel, which may be a downlink channel or uplink channel. For example, downlink control information, e.g. a corresponding message, may be signaled by a network node on PDCCH (Physical Downlink Control Channel) and/or a PDSCH (Physical Downlink Shared Channel) and/or a HARQ-specific channel. Uplink control information, e.g. acknowledgement signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Configuring a radio node, in particular a terminal or user equipment, may refer to the radio node being adapted or caused or set to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g., regarding one or more transmission timing structures and/or scheduled first signaling (e.g., data transmission) and/or the starting symbol. A radio node may configure itself, e.g., based on configuration data received from a network or network node. A network node may utilise, and/or be adapted to utilise, its circuitry/ies for configuring.

Generally, configuring may include determining configuration data representing the configuration and providing it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink signaling, in particular acknowledgement signaling, and/or configuring resources and/or a resource pool therefor.

Control signaling may be considered signaling of, and/or comprising, control information. Control information may be provided in a control information message. Control information may comprise in particular scheduling information like a grant (of uplink and/or downlink and/or sidelink resource/s) and/or a slot allocation indication and/or symbol allocation indication and/or power control information and/or link adaptation information and/or precoding information, e.g. for the downlink or downlink control information. In other cases, control information may comprise acknowledgement signaling (respectively, associated acknowledgement information), and in some variants in addition scheduling requesting information and/or measurement-related information, e.g. for the uplink or uplink control information.

A carrier may generally represent a frequency range or band. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency space.

It should be noted that the term "radio" in this disclosure may be considered to pertain to wireless communication in general, and may also include wireless communication utilising microwave frequencies.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2x communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency space and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency space and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Signaling may be associated to a specific channel. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink. Acknowledgement signaling, as well as signaling of an acknowledgement position indication may be considered examples of SCI, albeit in different directions of communication between participants. In particular, acknowledgement signaling may be considered to be in response to other control signaling (e.g., configuring control signaling), and thus be referred to as response control signaling. Configuring control signaling generally may configure a UE, e.g. schedule resources and/or a resource pool. Signaling of an acknowledgment position indication may be considered an example of configuring control signaling.

A transmission timing structure may have a duration (length in time) determined based on the durations of their symbols, possibly in addition to cyclic prefix/es used. The symbols of a transmission timing structure may have the same duration, or may in some variants have different duration. A slot may be considered an example of a transmission timing structure, and the term slot may be considered to be interchangeable with the term transmission timing structure in the context of this disclosure. A transmission timing structure or slot may comprise a predetermined number of symbols, e.g. 7 or 14. A mini-slot may comprise a number of symbols smaller than the number of symbols of a slot. A transmission timing structure may cover a time interval of a specific length, which may be dependent on symbol time length and/or cyclic prefix used. A transmission timing structure may pertain to and/or cover a specific time interval in a time stream, e.g. synchronized for communication. It should be noted that a subframe may be considered an example of a slot or transmission timing structure with a fixed duration of 1 ms.

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or Next Radio mobile or wireless communications technologies; however, this does not rule out the use of the present concepts and aspects in connection with additional or alternative mobile communication technologies such as the Global System for Mobile Communications (GSM). While the following variants will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects Some useful abbreviations comprise

| Abbreviation | Explanation |
|---|---|
| DCI | Downlink Control Information |
| PDCCH | Physical Downlink Control Channel |
| PDSCH | Physical Shared Data Channel |
| PUCCH | Physical Uplink Control Channel |
| PUSCH | Physical Uplink Shared Channel |
| RRC | Radio Resource Control |
| TDD | Time Division Duplex |

The invention claimed is:

1. A method of operating a network node in a Radio Access Network, the method comprising:
 transmitting a downlink control information message, the downlink control information message comprising a first allocation indication and a second allocation indication;
 the first allocation indication indicating a slot aggregation comprising a plurality of slots being allocated for communication, each slot comprising a plurality of symbols; and
 the second allocation indication indicating an allocation of symbols to at least one channel according to a predetermined allocation pattern.

2. The method according to claim 1, wherein the first allocation indication comprises at least one of a bit pattern indicating the number of slots being aggregated and a slot location indication, the slot location indication indicating the location of a reference slot of the slot aggregation.

3. The method according to claim 1, wherein the second allocation indication indicates an allocation of symbols to at least one channel according to a predetermined allocation pattern for at least two of the plurality of slots, and wherein the second allocation indication comprises a bit pattern, the bit pattern indicating at least one of: the allocation pattern; and the at least one channel the symbols are allocated to.

4. The method according to claim 1, wherein the allocation pattern indicates at least one from the group consisting of:
 a starting symbol; and
 an ending symbol; and
 a number of symbols allocated to a specific channel.

5. The method according to claim 1, wherein the allocation pattern indicates a guard period between symbols of the pattern allocated to a downlink channel and symbols of the pattern allocated to an uplink channel.

6. The method according to claim 1, wherein the downlink control information message comprises at least one deviation indication, a deviation indication indicating a deviation from the pattern for at least one slot.

7. A network node for a Radio Access Network, the network node comprising processing circuitry, the processing circuitry being configured cause transmission of a downlink control information message, the downlink control information message comprising:
 a first allocation indication and a second allocation indication;
 the first allocation indication indicating a slot aggregation comprising a plurality of slots being allocated for communication, each slot comprising a plurality of symbols;
 and the second allocation indication indicating allocation of symbols to at least one channel according to a predetermined allocation pattern.

8. The network node according to claim 7, wherein the first allocation indication comprises at least one of a bit pattern indicating the number of slots being aggregated and a slot location indication, the slot location indication indicating the
 location of a reference slot of the slot aggregation.

9. The network node according to claim 7, wherein the second allocation indication comprises a bit pattern, the bit pattern indicating at least one of:
 the allocation pattern; and
 the at least one channel the symbols are allocated to.

10. The network node according to claim 7, wherein the allocation pattern indicates at least one from the group consisting of:
 a starting symbol; and
 an ending symbol; and
 a number of symbols allocated to a specific channel.

11. The network node according to claim 7, wherein the allocation pattern indicates a guard period between symbols of the pattern allocated to a downlink channel and symbols of the pattern allocated to an uplink channel.

12. The network node according to claim 7, wherein the downlink control information message comprises at least one deviation indication, a deviation indication indicating a deviation from the pattern for at least one slot.

13. A method of operating a user equipment in a Radio Access Network, the method comprising:
 communicating utilizing a slot aggregation based on a received downlink control
 information message, the downlink control information message comprising a first
 allocation indication and a second allocation indication;
 the first allocation indication indicating a slot aggregation comprising a plurality
 of slots being allocated for communication, each slot comprising a plurality of symbols;
 and
 the second allocation indication indicating an allocation of symbols to at least
 one channel according to a predetermined allocation pattern.

14. The method according to claim 13, wherein the first allocation indication comprises at least one of a bit pattern indicating the number of slots being aggregated and a slot location indication, the slot location indication indicating the location of a reference slot of the slot aggregation.

15. The method according to claim 13, wherein the second allocation indication indicates an allocation of symbols to at least one channel according to a predetermined allocation pattern for at least two of the plurality of slots, and wherein the second allocation indication comprises a bit pattern, the bit pattern indicating at least one of:
 the allocation pattern; and
 the at least one channel the symbols are allocated to.

16. The method according to claim 13, wherein the allocation pattern indicates at least one from the group consisting of:
 a starting symbol; and
 an ending symbol; and
 a number of symbols allocated to a specific channel.

17. The method according to claim 13, wherein the allocation pattern indicates a guard period between symbols of the pattern allocated to a downlink channel and symbols of the pattern allocated to an uplink channel.

18. The method according to claim 13, wherein the downlink control information message comprises at least one deviation indication, a deviation indication indicating a deviation from the pattern for at least one slot.

* * * * *